ALUMINUM-GERMANIUM CONTACT

Filed June 26, 1961

INVENTOR

Lee Van Gorman

BY

Stevens, Davis, Miller & Mosher

ATTORNEYS

United States Patent Office 3,222,630 Patented Dec. 7, 1965

3,222,630
ALUMINUM-GERMANIUM CONTACT

Lee Van Gorman, Richardson, Tex., assignor to Texas Instruments Incorporated, Dallas, Tex., a corporation of Delaware Filed June 26, 1961, Ser. No. 119,594
3 Claims. (Cl. 338—322)

Figure 2:
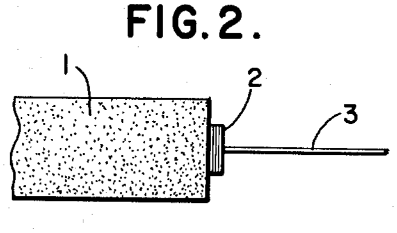

The present invention relates to aluminum-germanium alloys and articles manufactured with such alloys. More specifically, the invention relates to aluminum-germanium alloys in the eutetcic range, to their use as contact materials and to assemblies comprising semiconductive materials, lead wires and contact materials consisting of the alloys of the present invention.

It is generally known that aluminum provides surface contact material having high electrical conductivity. Because of this property, the surface area of the contact material may be kept relatively small, consistaent with the needs of small electronic devices. However, certain difficulties have been encountered in the use of aluminum as a surface contact material. Notably, when alloyed with certain lead wire materials, aluminum forms undesirable inter-metallic compounds which result in brittle and weak bonds, thus seriously undermining the reliability of contact formation and lowering the performance of devices containing such contacts.

Also, according to certain contact formation techniques, it is desirable to plate the contact material with nickel or another metal and then bond the contact to the nickel plate by the use of solder. It has been found, however, that the nickel plating of a pure aluminum contact material is almost impossible.

Thus, in spite of their desirability because of high electro-conductivity, aluminum contact materials for the application of surface contacts to semiconductive materials have not found as wide use as expected and suffer from the above-mentioned serious limitations.

To date, no satisfactory method for avoiding the formation of inter-metallic aluminum-gold compounds in the bonding of gold lead wires to aluminum contact materials has been found. Nor has any solution been found to the problem of metal plating aluminum contact materials to facilitate the application of lead wires by soldering to the metal plate.

It is an object of the present invention to provide new contact materials which substantially retain the high electrical conductivity of aluminum contact materials, but avoid their serious limitations.

A further object of the present invention is to provide novel aluminum-germanium alloys to which lead wires, especially gold lead wires, may be attached without the formation of undesirable inter-metallic compounds and the consequent weakening of the bond and with the preservation of high electrical conductivity through the contact.

Another object of the present invention is to provide novel aluminum-germanium contact materials which may be readily metal plated by conventional techniques and thereupon joined to lead wires by soldering methods.

Another object of the invention is to produce transistor assemblies constaining strong contacts formed with the materials of this invention.

Other highly desirable objects of the invention will become apparent from the following description of the invention.

My invention comprises the discovery that superior contact materials for the application of leads to semiconductive devices may be obtained from alloys of germanium and aluminum in approximately eutectic proportions.

According to my invention, I have found that the foregoing objectives and many other important objectives may be achieved by employing on the transistor surface or other semiconductive surface contact material comprising an alloy of aluminum and germanium containing from 52% to 56% by weight of germanium, the remainder aluminum. This range of alloy constituents is in the eutectic range of composition for aluminum-germanium alloys.

I have discovered that when aluminum-germanium alloys of the proportions specified are employed as contact materials on transistor surfaces, they may be bonded with gold or other metal lead wires without the formation of "the purple plague," i.e., undersirable gold-aluminum inter-metallic compounds.

Figure 1:
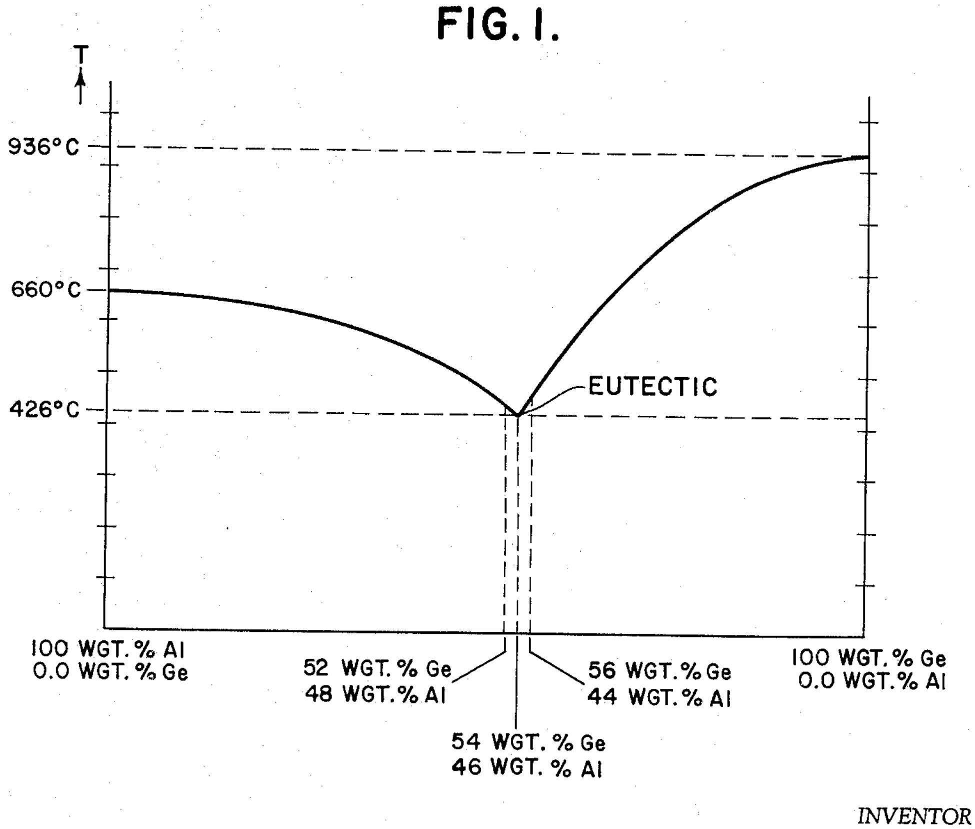

In the drawing, FIG. 1 represents a phase diagram of binary alloys of aluminum and germanium over their complete ranges of composition.

FIG. 2 is a side view of an assembly including a contact employing the alloys of the present invention.

By reference to the accompanying phase diagram, FIG. 1, it will be seen that aluminum, having a melting point of 660° C., and germanium, having a melting point of 936° C., from an alloy of eutectic proportions upon cooling to a temperature of approximately 426° C. At this temperature, an alloy of approximately 54% germanium and 46% aluminum is formed. Although the 54% germanium, 46% aluminum alloy has optimum characteristics for present applications, my experiments have also determined that other aluminum-germanium alloys approaching eutectic proportions are satisfactory. Thus, alloys of the present invention may contain from 52% to 56% by weight of germanium and from 48% to 44% by weight of aluminum.

Referring now to FIG. 2, it will be seen that transistor device 1, formed from a silicon semiconductive material, is provided with a layer of contact material 2 of an aluminum-germanium alloy containing from 52% to 56% by weight germanium, the remainder aluminum. A gold lead wire 3 is alloyed to the aluminum-germanium alloy 2 by being pressed against the surface of contact material 2, while the latter is heated to a temperature of approximately 350° C. The pressure on the gold lead against the contact material is maintained at a sufficient level to compensate for the 6° C. temperature difference between the existing temperature, 350° C., and the eutectic temperature of gold and germanium which is 356° C.

In the above structure, the gold alloys with the germanium of the aluminum-germanium alloy to form a ternary system. However, the gold alloys directly only with the germanium at a temperature of bonding and so no undesirable gold-aluminum compounds are formed.

The present invention will perhaps be better understood in the light of the following examples:

*Example I*

In preparing alloys according to the present invention, 52 grams of germanium and 48 grams of aluminum are carefully weighted into a quartz crucible. The metals in the crucible are then heated to approximately 1000° C. at which temperature both metals become molten and mix completely. The contents of the crucible are then cooled, solidifying at approximately 426° C.

*Example II*

54 grams of germanium and 46 grams of aluminum are carefully weighed into a quartz crucible and alloyed according to the method disclosed in Example I.

*Example III*

56 grams of germanium and 44 grams of aluminum are carefully weighed into a quartz crucible and are alloyed according to the procedure set out in Example I.

It should be noted that it is only necessary to heat the metals to a temperature of from 50° C. to 100° C. above the melting point of the highest melting component. Since aluminum melts at 660° C. and germanium at 936° C., it is necessary to heat the combined metals to a temperature of from 986° C. to 1036° C. According to the examples set forth above, it has been found satisfactory to heat the metals to 1000° C., but it should be clear that heating to any temperature within the stated range will achieve the same results, namely, a thorough mixing and alloying of the aluminum and germanium components placed in the crucible.

In utilizing the alloys in the present invention, a transistor device of a semiconductive material with suitable masking to define the desired contact areas is placed in a standard vacuum deposition apparatus. Aluminum-germanium alloys of the type in question are then introduced into a crucible in the vacuum housing and the crucible is heated to evaporate the alloys. The evaporated aluminum-germanium alloy is thereby deposited on the selected areas of the transistor device which are not covered by the masking material to provide discrete areas of surface contact material.

After the contact material has been deposited, a gold lead wire may be joined to the contact material by the following method. First, the transistor device with the germanium-aluminum alloys applied thereto is heated to a temperature of 350° C. The eutectic temperature between gold and germanium is about 356° C. If pressure is applied to the gold wire as it is forced against the aluminum-germanium alloy contact material, the added pressure will compensate for the 6° C. temperature difference by lowering the eutectic temperature between gold and germanium by that amount. It should be noted that the temperature is not raised to the eutectic temperature of gold and germanium, since the gold wire would pull out when pressure was released, if the gold-germanium alloy was in a molten condition. It should also be clear that it is not necessary, during bonding of the lead to the contact material, to raise the temperature to the eutectic temperature of germanium and aluminum, since it is desired to alloy the gold with germanium in the system, not with the aluminum.

I have described my invention mainly in terms of applying contact material to silicon semiconductor devices. The present invention may also be used in producing contacts and assemblies with other common semiconductive material, such as germanium.

It has been found that an alloy contact material containing from 52% to 56% by weight of germanium, the balance of aluminum, is to be preferred. If more than 48% aluminum is present, segregation of a portion of the aluminum will occur upon cooling of the alloy melt. Then, when it is attempted to form a bond between the contact material and metal lead wires, undesirable intermetallic compounds will form. In the case of a gold lead wire, gold-aluminum alloys, the "purple plague," will be formed and weak bonds will result. If more than 56% by weight of germanium is employed in the alloy, "purple plague" is not observed, but a very brittle bond is obtained.

Other embodiments and applications of the present invention may be devised by those skilled in the art without departing from the spirit of the invention or the scope of the following claims.

I claim:

1. A method for producing semiconductor contacts having high electrical conductivity comprising coating a selected area of the surface of the semiconductor body with a contact material comprising an alloy containing 52% to 56% by weight germanium, the remainder aluminum, heating the semiconductor device and contact material to approximately 350° C., and pressing a gold lead wire against said contact material causing said gold lead wire to alloy with the germanium in said contact material.

2. The method of claim 1 wherein the germanium-aluminum alloy is applied to the surface of said semiconductor body by evaporation and deposition on said surface in vacuo.

3. A semiconductor device comprising a body of monocrystalline silicon, an ohmic contact on said body in the form of a thin layer of an alloy of germanium and aluminum in substantially eutectic proportions, said layer being adherent to the surface of the body, and a gold lead wire pressure-bonded to said layer.

References Cited by the Examiner

UNITED STATES PATENTS 2,905,873 9/1959 Ollendorf et al. ______ 317—235

FOREIGN PATENTS 537,909 3/1957 Canada.

OTHER REFERENCES

Hansen: Constitution of Binary Alloys, McGraw-Hill Book Co., Inc., 1958, page 97.

DAVID J. GALVIN, *Primary Examiner.*

GEORGE N. WESTBY, *Examiner.*